United States Patent [19]

Stout et al.

[11] Patent Number: 4,617,112
[45] Date of Patent: Oct. 14, 1986

[54] THERMAL GRAVITY CLASSIFYING APPARATUS AND METHOD

[75] Inventors: Michael E. Stout; Bobbie Peacock; Jarl Lindroos, all of Peachtree City, Ga.

[73] Assignee: M.A. Industries, Inc., Peachtree City, Ga.

[21] Appl. No.: 666,709

[22] Filed: Oct. 31, 1984

[51] Int. Cl.⁴ .............. B03B 5/30; B03B 5/36; C22B 7/00; C22B 7/04
[52] U.S. Cl. .................. 209/11; 209/174; 209/175; 209/189; 209/193; 75/63; 266/205
[58] Field of Search .......... 209/174, 172, 173, 172.5, 209/11, 182, 175, 177, 178, 180, 182–188, 201, 203, 189, 190, 193; 75/63; 266/205; 134/5, 104

[56] References Cited

U.S. PATENT DOCUMENTS

| | | | |
|---|---|---|---|
| 284,063 | 8/1883 | Roberts | 209/175 |
| 2,061,250 | 11/1936 | Perkins | 266/205 |
| 2,710,691 | 6/1955 | Herkenhoff | 209/172.5 |
| 2,843,473 | 7/1958 | Colbry et al. | 75/63 |
| 3,252,769 | 5/1966 | Nagelvoort | 209/172 |
| 3,442,643 | 5/1969 | Ackerman | 209/175 |
| 4,194,926 | 3/1980 | Barnsbee | 209/173 |
| 4,299,376 | 11/1981 | Weiss | 75/63 |

FOREIGN PATENT DOCUMENTS

| | | | |
|---|---|---|---|
| 81047 | 8/1920 | Fed. Rep. of Germany | 209/173 |
| 2800224 | 7/1979 | Fed. Rep. of Germany | 209/11 |
| 0003112 | 2/1978 | Japan | 209/11 |
| 0108004 | 9/1978 | Japan | 75/63 |

OTHER PUBLICATIONS

"Amalgamation of Gold-Ores from Silver and Gold", J. B. Ford & Co., Rossiter W. Raymond, 1876.

Primary Examiner—S. Leon Bashore
Assistant Examiner—Thomas M. Lithgow
Attorney, Agent, or Firm—Jones & Askew

[57] ABSTRACT

A thermal gravity classifier in which various nonferrous scrap metals are classified and separated, using a single tank containing two layers of molten media. Shredded nonferrous scrap containing metal constituents such as aluminum, zinc, lead, and copper or the like are introduced to the top of the tank containing an upper layer of molten zinc, floating on a lower layer of molten lead. Metals such as aluminum, having a specific gravity less than zinc, by a screw conveyor approximately parallel with the top surface. Heavier metals and alloys such as copper or the like, having a melting point above the temperature within the tank, fall through the zinc layer and are conveyed from the tank by a separate screw conveyor extending up a diagonal wall of the tank. Metals such as lead and zinc, having a melting point lower than the temperature maintained within the tank, melt and gravitate to the appropriate molten layer in the tank. The molten metals are separately withdrawn from the layers in the tank from time to time.

13 Claims, 5 Drawing Figures

THERMAL GRAVITY CLASSIFYING APPARATUS AND METHOD

FIELD OF THE INVENTION

This invention relates in general to the separation and classification of metals, and relates in particular to apparatus and method for classifying selected nonferrous and nonmagnetic ferrous metals from metallic scrap.

BACKGROUND OF THE INVENTION

Scrap metal reclamation for some time has been a significant source of ferrous and nonferrous metals. Reclaimed metals can be refined to the ingot state at a cost substantially less than the cost of extracting and refining virgin metals, and these cost savings become even more significant as energy costs escalate. Scrapped automobiles are one of the most significant sources of reclaimable scrap metals, although other domestic and industrial scrap such as electric motors, printing plates, electrical cable, machinery, and home appliances also are significant sources of scrap metal.

Scrap automobiles and other scrap metal typically are initially treated by passing the scrap through a shredder, many of which are capable of reducing whole automobiles to relatively small shreds of metal and other constituent components of the original article. The nonmetallic components of the shredded articles, being significantly lighter and less dense than the metallic shreds, are relatively easily separated by flotation or other known techniques. Likewise, the ferromagnetic property of ferrous metals permits relatively economical and rapid separation of those metals from the nonferrous metallic scrap. The remaining nonferrous scrap metal, however, is not as readily separable into constituent metallic groups or alloys for further refinement and reuse. Although steel and other ferrous metals make up the bulk of most scrap metal, significant amounts of nonferrous metals and their alloys, such as aluminum, copper, lead, and zinc, are available in commercially worthwhile percentages in stocks of typical scrap metal. However, these nonferrous metals are useful only when individual constituent metals are classified and separated from each other in an effective and economical manner.

Due to the relatively low melting point of nonferrous metals such as lead and zinc, the use of thermal processes has been suggested for separating such metals from other nonferrous metals and alloys having higher melting points. Such thermal separation in a relatively crude form simply calls for subjecting the nonferrous scrap mixture to a temperature greater than the melting point of the metals to be separated. These metals, such as lead and zinc, melt and can then be mechanically separated from the remaining solids having a higher melting point. However, further refining of the lead-zinc mixture is required to classify and separate each metal.

Another prior art proposal involves selective smelting to remove lead and zinc from shredded nonferrous scrap also containing other metals. In the typical selective smelter of the prior art, at least two baths of molten liquid are provided in tandem. The first molten bath is maintained at a temperature only slightly greater than the lowest melting point of the metals to be separated in the corresponding molten baths. The temperature of the second molten bath is slightly greater than the melting point of the metal to be removed in that second bath, and so on. As the scrap metal is moved in tandem through the first bath and then the second bath, the metal having the lower melting point (e.g., lead) will melt and become separated in the first bath, and the metal having the next-higher melting point (e.g., zinc) with melt and become separated in the second bath. Additional heated baths in tandem, maintained at selected increased temperatures, can also be provided in theory, although the capital costs and energy operating costs of even a two-bath selective smelting system are substantial.

One example of apparatus for selective smelting of nonferrous metals is shown in U.S. Pat. No. 4,299,376. Another apparatus for thermal recovery of scrap metal is shown in U.S. Pat. No. 1,515,616.

SUMMARY OF THE INVENTION

Stated in general terms, selective melting according to the present invention is accomplished by placing nonferrous scrap in a single container holding at least two heated fluids. The fluids in the container have different specific gravities, and each fluid thus defines a separate layer in the container. The container and its fluid contents are maintained at an elevated temperature high enough to melt some but not all of the nonferrous metals and alloys to be separated, and to maintain the fluids in the container in the molten state.

As nonferrous scrap metal comprising various constituent metals and alloys are introduced at the top surface of the uppermost fluid layer in the container, metals having a melting point greater than the temperature within the container will remain in the solid state. Any of those solid metals having a specific gravity less than that of the uppermost layer in the tank will, moreover, float on the surface of that upper layer, and these floating metals thus are classified and may be removed from the container. Nonmetallic objects such as rocks and glass also float on the surface and are removed with the floating metal solids for subsequent classification. Nonmelting metals of specific gravity greater than the top layer will sink at least to the interface between the upper and lower layers of molten fluid in the container, and may sink to the bottom of the tank depending on the relative specific gravity compared with that of the lowermost fluid layer. These sunken solid metals likewise are classified and are removable from the lower molten fluid layer in the container. Those metals having a melting point below the temperature in the container are melted and thus become separated from the scrap metal components having a higher melting point. This molten scrap, in turn, will gravitate to the appropriate fluid layer in the container for subsequent removal.

Stated somewhat more particularly, selective separation according to the present invention may be accomplished by introducing the scrap metal into a container containing two layers of individual molten metals, having dissimilar specific gravities, sought to be separated. Zinc and lead are used in one specific example, the molten zinc having a lower specific gravity than lead and thus forming an upper layer floating on the subjacent layer of molten lead within a single container. The container is heated to a temperature which maintains the zinc and lead baths in the molten state, but below the melting points of other desired nonferrous metals such as aluminum and the so-called "red metals" including copper, brass, and bronze and their alloys. Aluminum scrap, having a specific gravity substantially less than that of zinc, floats on the zinc bath in the container, and may be removed by skimming or the like. The red metals, having a specific gravity greater than zinc, sink to the lower portion of the container and thereafter are mechanically removed. Metals having a lower melting point than the temperature in the container will melt and gravitate to the appropriate layer in the container.

The container includes outlets for separately drawing the molten metals from either the upper or lower layers, when those layers exceed predetermined levels. In particular, the container may have an upper discharge port from which the molten metal of the uppermost layer will pour, when exceeding a predetermined level. The molten metal in the lower layer may be routed through an opening in a bottom wall of the container, and thence up into a well having a siphon outlet at an elevation corresponding to a predetermined level for the lowermost layer of molten metal. When the lowermost molten metal layer reaches the predetermined level, that metal will siphon out of the well.

Accordingly, it is an object of the present invention to provide an improved method and apparatus for classifying metals.

It is another object of the present invention to provide improved apparatus and method for selective smelting of metals.

It is still another object of the present invention to provide improved apparatus and method for selective smelting of nonferrous metals.

It is still a further object of the present invention to provide a more efficient apparatus and method for thermal classification of scrap metal or the like.

Other objects and advantages of the present invention will become more readily apparent from the following discussion of a preferred embodiment.

DETAILED DESCRIPTION OF PREFERRED EMBODIMENT

Figure 1:
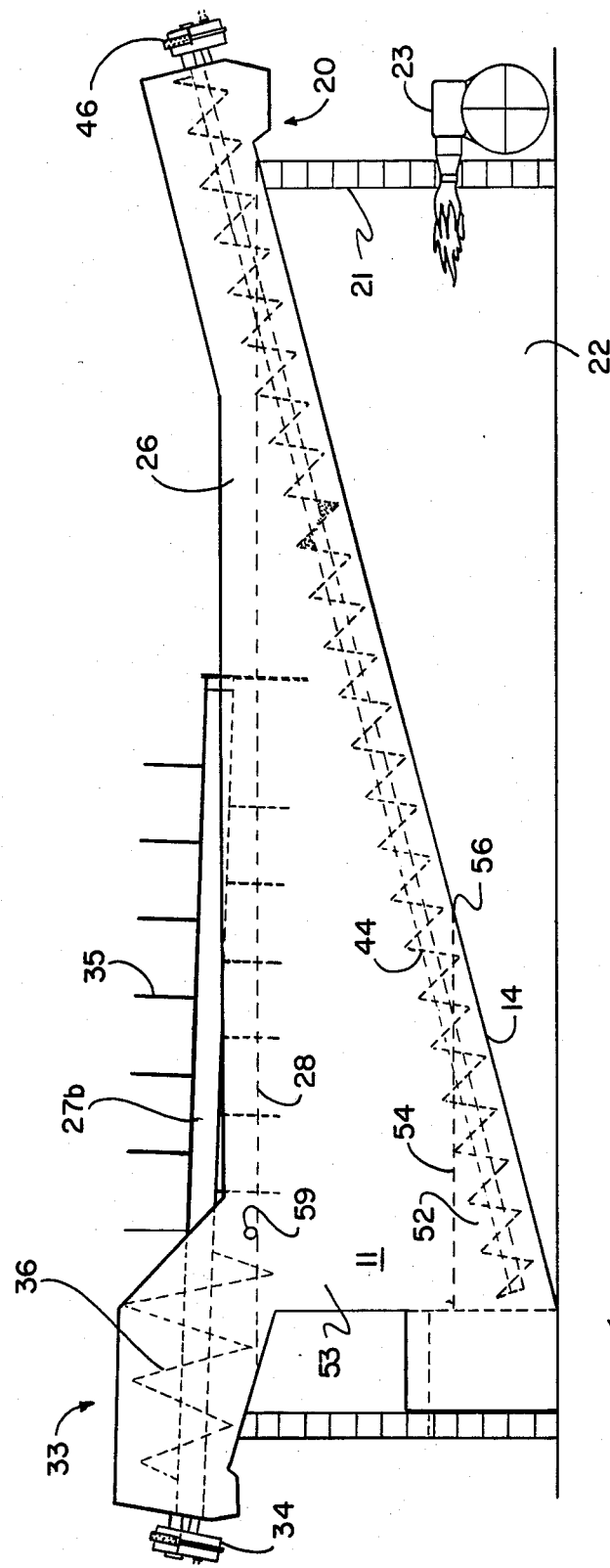
FIG. 1 is a semi-schematic elevation view, shown partly broken away for illustrative purposes, of a thermal gravity classifier according to a preferred embodiment of the present invention.
Figure 5:
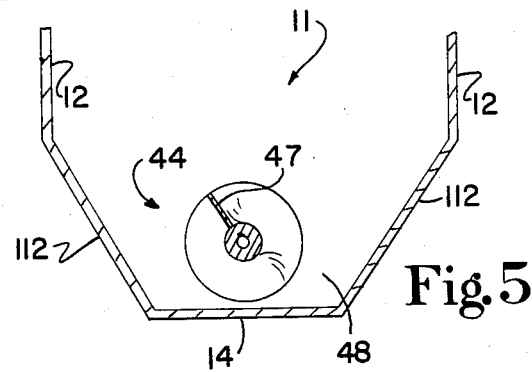
FIG. 5 is a section view taken along line 5—5 of FIG. 3.

Turning first to FIG. 1, there is shown generally at 10 a thermal gravity classifier apparatus constructed and operated according to the present invention, and including a tank 11 substantially filled with a two-stage molten heavy media. The tank 11 has side and bottom walls preferably fabricated of steel, including substantially vertical side walls 12 (FIG. 2) and a substantially vertical end wall 13 (FIG. 3) at one end of the tank. The lower ends of the vertical side walls 12 join the diagonal side walls 112, which slant downwardly and inwardly (FIG. 5) to join the bottom 14 of the tank 11. The bottom 14 of the tank slopes upwardly from the lower end of the side wall 13 at the one end of the tank, to an upper end 15 at the other end thereof. As best seen in FIG. 3, the upper end of the bottom wall 14 extends a distance beyond the tank upper end 15 and outside the outer structure 16 of the tank, to form part of a discharge outlet 20 described below. The tank 11 is surrounded with thermal insulation 21 to form a firebox 22 below the sloping bottom wall 14 of the tank, and one or several fuel burners 23 are mounted in the outer structural wall 16 to heat the firebox, the tank 11, and the contents of the tank. The burners may be arranged to provide different temperature zones along the depth of the tank 11, so as to reduce the solubility of contiguous layers of molten media in the tank.

Figure 2:
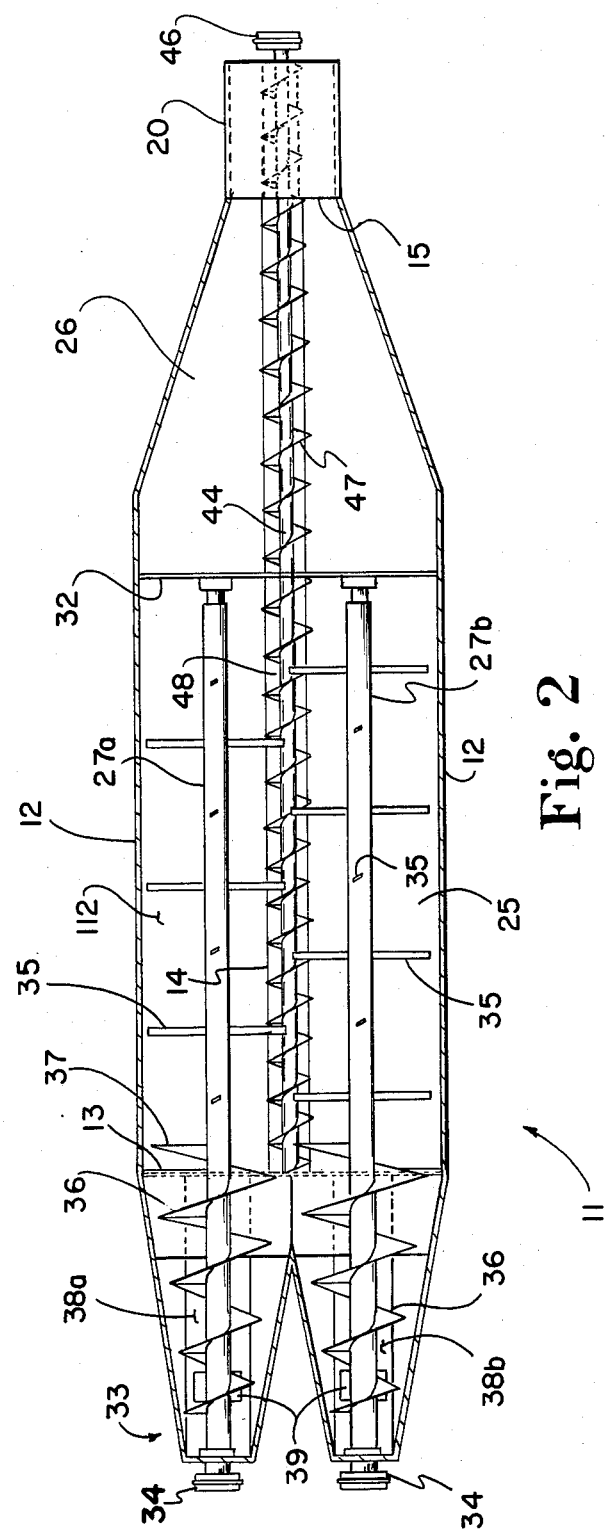
FIG. 2 is a top plan view of the apparatus shown in FIG. 1.
Figure 3:
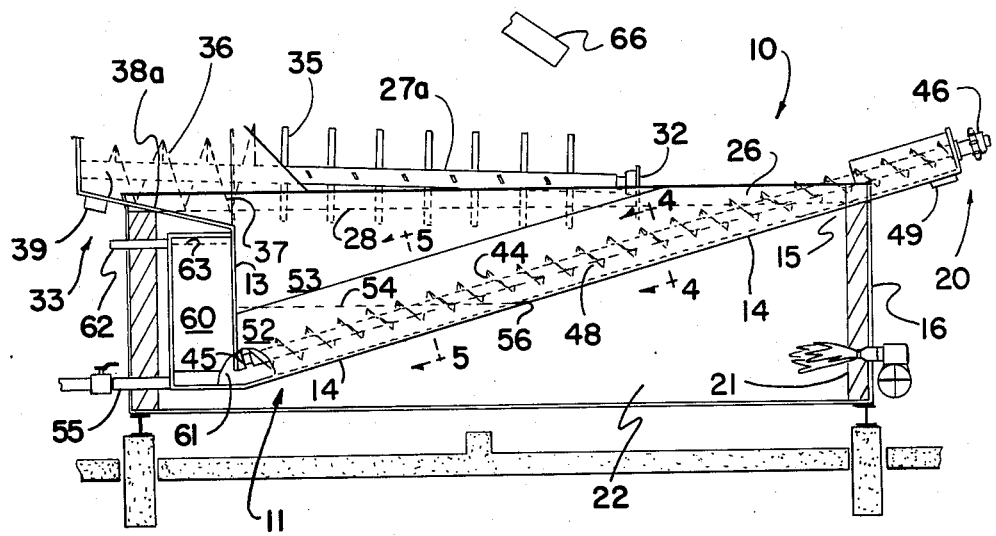
FIG. 3 is a sectioned elevation view of the disclosed embodiment, shown in somewhat greater detail than FIG. 1.

Turning to FIG. 2, it is seen that the tank 11 includes a central portion 25 which is substantially rectangular in length and width, and also includes an end portion 26, shown at the right end of the tank in FIG. 2, which tapers somewhat in the shape of a truncated cone toward the upper end 15 of the tank. A pair of float removal screws 27a, 27b are mounted on top of the tank 11, above and approximately parallel to the top surface 28 of the upper liquid layer normally maintained in the tank. The screws 27a and 27b are rotatably supported at one end on the wall 32 which bridges the tank sides 12, and the screws extend leftwardly beyond the end wall 13 to terminate in the float removal discharge outlet 33. Each of the float removal screws 27a and 27b is rotatably driven by a suitable power source, preferably a variable-speed drive, such as the hydraulic drive shown generally at 34 in FIG. 1; these drives are omitted from FIG. 2 for illustrative purposes.

Each of the float removal screws 27a and 27b has paddle flights 35 radiating outwardly for immersion in the top surface 28, along the greater part of the central portion 25 of the tank 11. Starting at a location just inside the end wall 13 of the tank, the flight of each screw 27a, 27b becomes a solid auger screw conveyor 36. The screw conveyor 36 of each float removal screw 27a, 27b continues outwardly to terminate within the float removal discharge outlet 33, disposed above the top of the tank 11 and outside the end wall of the tank. As best seen in FIG. 3, the radius of the screw conveyors 36 tapers from a maximum radius at the beginning of the screw conveyor (in the vicinity of the tank end wall 13) to a minimum radius at the end of the screw 27a, 27b. The maximum radius of each screw conveyor 36 is sufficient to immerse the outermost portion 37 of the screw conveyor in the top surface 28 of the molten liquid within the tank 11. Separate tapered troughs 38a, 38b, sloped to match the peripheral taper of the screw conveyors 36, extend outwardly from the upper end of the tank wall 13 to the float removal discharge outlet 33. An opening 39 is formed in the outer end of each trough 38a, 38b.

Figure 4:
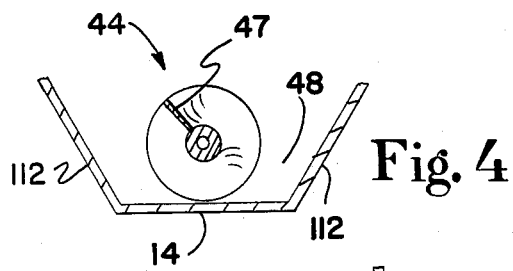
FIG. 4 is a detailed section view taken along line 4—4 of FIG. 3.

Rotatably mounted along the sloped bottom 14 of the tank 11 is the bottom removal screw 44. This screw is rotatably journaled at 45 adjacent the lower end of the end wall 13, and extends upwardly to terminate within the bottom removal discharge outlet 20, outside the outer end 16 of the tank 11. The bottom removal screw is rotated by the variable-speed hydraulic drive motor 46, mounted at the discharge outlet 20. The bottom removal screw 44 has a solid flight 47 extending along the entire length of the screw. As best seen in FIGS. 3 and 4, part of the circumference of the solid flight 47 fits within the trough 48 formed at the conjunction of the tank bottom wall 14 and diagonal side walls 112, and extending upwardly into the tank end portion 26 to enter the discharge outlet 20. A discharge opening 49 is formed in the bottom of the trough 48, in the discharge outlet 20.

The tank 11 of the disclosed embodiment contains two layers of molten media selected in view of the particular metals being classified and separated by the apparatus. In the present embodiment, these two media are lead and zinc, and the layers of molten lead and zinc in the tank 11 are respectively designated at 52 and 53. Because the specific gravity of zinc is less than that of lead, the zinc layer 53 in effect floats on top of the layer 52 of lead; the interface between the layers of zinc and lead is denoted at 54. The sloped bottom 14 passes through the interface 54 at a point 56, FIG. 3, so that only the upper molten layer 53 contacts the sloped bottom above that point. These metals may be introduced to the tank 11, or withdrawn therefrom, in a molten state by means of the pipe 55 communicating with the lowermost point of the tank, or alternatively may be introduced through the open top of the tank. In either case, the firebox 22 must be operated at an elevated temperature high enough to maintain both the zinc and lead layers in a molten state. As becomes apparent below, however, the temperature within the tank 11 should be below the melting point of some metals being classified by the apparatus.

The tank is initially charged with molten zinc and molten lead sufficient to place the top surface 28 of the zinc layer 53 at a level just below the zinc pour outlet 59 (FIG. 1) formed in a side of the tank 11. This outlet 59 connects to a suitable pouring spout or the like (not shown) under which molds may be placed to receive molten zinc, as described below. The pour outlet 59 also may optionally be provided with a suitable valve.

The tank end wall 13 separates the tank itself from a liquid well 60, at one end of the apparatus. This liquid well 60 communicates with the bottom of the tank 11 through the opening 61 in the bottom of the end wall 13. A lead pour outlet 62 connects to the upper end of the well 60 and extends through the firebrick 21 at the adjacent outer end of the apparatus. In the normal operation of the apparatus as described herein, molten lead from the lead layer 52 flows through the opening 61 and enters the well 60, rising to a nominal level 63 just below the lead pour outlet 62 communicating with the well. The lead level 63 in the well 60 is higher than the zinc-lead interface 54 in the tank 11, due to the weight of the zinc layer 53 on the lead layer 52.

The operation of the disclosed embodiment is now considered. With the tank 11 containing molten zinc and molten lead as described, it is assumed that the scrap metal being classified contains one or more of the following nonferrous metals and alloys thereof: aluminum, lead, zinc, and the so-called "red metals" such as copper, brass, bronze, and other alloys of copper. This scrap metal is fed into the central portion 25 of the tank by the chute 66 or any other suitable conveyor, where the scrap metal mix lands directly in the top surface 28 of the molten zinc layer 53 maintained in the tank. The chute 66 preferably is positioned to feed the scrap metal into the tank 11 at a location above only the upper molten layer 53, namely, to the right of the point 56 as seen in FIG. 3. Aluminum or other metal having a specific gravity less than the specific gravity of zinc will float on the top surface 28, but copper and the other red metals having a higher specific gravity than zinc will sink toward the bottom of the tank 11. The tank and its molten contents preferably are maintained at a temperature preferably in the range of 830°–840° F., which is slightly greater than the melting point of zinc (786° F.) and lead (621° F.), but is much less than the melting point of copper (1980° F.) or the other red metals sought to be classified by the disclosed embodiment. Thus, metals such as lead and zinc, having a melting point below the temperature in the tank 11, are melted and gravitationally seek their appropriate level in the tank. The melted zinc constituents of scrap introduced to the tank 11 thus combine with the zinc layer 53, and melted lead constituents sink by gravity to join the lead layer 52 at the bottom of the tank.

The paddles 35 on the rotating float removal screws 27a and 27b are pitched to transport the floating metals along the top surface 28 toward the float removal discharge outlet 33. These paddles 35 also strike and momentarily immerse the floating scrap metal for better heat transfer, aiding the melting and recovery of any lead or zinc (or other meltable constituents) lodged on floating scrap particles. As the floating scrap approaches the rear of the tank 11, this floating scrap is engaged by the solid screw conveyor 36 and conveyed from the tank, along the tapered troughs 38a or 38b, and to the outlet opening 39 where the floating scrap (principally aluminum, in the present embodiment) is classified and collected for further use.

The sunken solids in the tank 11 sink to the trough 48 and are collected by the bottom removal screw 44, where the solid flight 47 of that screw moves the sunken solids upwardly along the trough through the molten layer to the discharge opening 49 of the discharge outlet 20. These solids, principally copper and other red metals in the present example, thus are classified from the incoming scrap mixture and are collected for further use. Because the scrap metal enters the tank 11 beyond the end point 56 of the lower molten layer, the sunken red metal solids normally do not contact the lower molten layer 52. Any such solids which do sink to the molten lead layer will float at the interface 54 until moved to the bottom removal screw 44 by the agitating action of that screw.

The amount of molten lead and molten zinc in the tank 11 will increase over time, as the lead or zinc constituents of the incoming scrap become melted and add to the molten layers already in the tank. When the level 28 of the molten zinc layer 53 exceeds the level of the zinc pour outlet 59 (FIG. 1) in the tank, molten zinc is discharged from that outlet to pour into suitable molds provided for the purpose. As mentioned previously, this zinc discharge can take place continuously through the opening 59, or can be controlled for batch discharge by a valve (not shown) provided for that purpose.

Molten lead is removed from the lead layer 52 by way of the well 60, which in effect comprises a siphon for withdrawing lead from the tank 11. When the volume of molten lead in the tank 11 forces the lead level 63 above the lead pour outlet 62 near the top of the well 60, molten lead flows through the lead pour opening into suitable molds provided for the purpose.

It should now be apparent that the thermal gravity classifier 10 of the disclosed embodiment will classify and separate as many as four different kinds of metals (aluminum, zinc, lead, and copper-based metals) at the same time, using only a single tank and requiring only the fuel necessary to heat a single tank. The present thermal gravity classifier is not limited to batch operation and can operate on a continuous volume of scrap input, with molten metals being withdrawn from the molten lead layers continuously or from time to time to maintain the proper levels in the tank.

It should also be apparent that the present invention is not to be limited by the specific recitation of molten zinc and molten lead layers in the disclosed embodiment. It is considered within the scope of the present invention to utilize two or more layers of other molten liquids within a single tank, in the course of practicing the present invention.

Moreover, it should be understood that the foregoing relates only to a preferred embodiment of the present invention, and that numerous changes and modifications may be made therein without departing from the spirit or scope of the invention as defined in the following claims.

We claim:

1. The method of selective separation of constituent metals from a scrap mixture containing different kinds of metals, comprising the steps of:

providing a first molten metal in a container;

providing a second molten metal in said container, the specific gravity of said second metal being less than that of the first metal so that the second molten metal forms an upper layer floating on the first molten metal, said first and second molten metals respectively being first and second metals of the constituent metals being separated from the scrap mixture;

heating the first and second molten metals to a selected temperature above the melting points of said first and second metals, and above the melting point of some but not all of the metals to be separated;

placing the mixture of scrap metals into the upper layer of molten metal, whereby the metal constituents having melting points below said selected temperature are melted and the other metal constituents remain solid;

said melted metal constituents gravitating to join either said upper or lower layer of molten metal, depending on the specific gravity of the melted metal constituents, and thus the first and second constituents become separated from the scrap mixture;

removing the metallic solids floating on the surface of said upper layer, said floating metallic solids having a specific gravity less than the specific gravity of the second metal and thus becoming a third constituent separated from the scrap mixture; and removing the metallic solids which sink at least to the lower layer of molten metal, said sinking solids having a specific gravity greater than the specific gravity of the second metal and thus becoming a fourth constituent separated from the scrap mixture; and withdrawing the melted metal constituents from one or more of the first and second molten metal layers from time to time, as the molten metal constituents add to said layers.

2. Apparatus for selective separation of constituents including a mixture of dissimilar metals, comprising:

a tank containing first and second molten metals, the specific gravity of said second metal being greater than that of the first metal so that the first molten metal forms an upper layer floating on the second molten metal forming a lower layer in the tank;

said first and second metals respectively being first and second metals of the constituents being separated from the scrap mixture;

means for introducing the mixture of constituent metals to said upper layer of molten metal in said tank;

means operative to maintain the molten contents of said tank at a selected elevated temperature which maintains the metals of said layers in a molten state and exceeds the melting point of some but not all of the constituent metals making up the mixture, so that the scrap metal constituents having melting points below said selected temperature become melted and gravitate to join either said upper or lower molten metal layer depending on the specific gravity of the melted constituent, thereby becoming first and second constituents separated from the mixture;

first means operative to remove solid constituents floating on the surface of said upper molten metal layer, said solid constituents having a specific gravity less than the specific gravity of said upper layer and a melting point above said selected temperature, and thus being a third constituent separated from the mixture; and second means operative to remove the solid constituents which have a specific gravity greater than the specific gravity of said upper layer and a melting point above said selected temperature, and which therefore remain solid and sink at least to said lower layer and thus become a fourth constituent separated from the mixture;

first molten metal outflow means associated with said tank for withdrawing a quantity of the first molten metal from said upper layer in the tank; and second molten metal outflow means associated with said tank for withdrawing a quantity of the second molten metal from the lower layer in the tank.

3. Apparatus as in claim 2, wherein:

said first molten metal outflow means is operative to withdraw molten metal from said upper layer when the top surface of the upper layer reaches a predetermined level; and said second molten metal outflow means is operative to withdraw molten metal from below the upper surface of said lower layer when the interface between upper and lower layers reaches a predetermined level in the tank.

4. Apparatus as in claim 2, wherein:

said first means comprises conveyor means substantially parallel to the top surface of said upper layer and operative to move said floating solids along the top surface to a location for collection and removal.

5. Apparatus as in claim 4, wherein:

said conveyor means comprises rotatable means having an axis of rotation substantially parallel to said top surface, and having flight means contacting said top surface to convey material floating thereon to said collection location in response to rotation.

6. Apparatus as in claim 5, wherein said flight means comprises:

screw means extending on said rotatable means from said collection location to a first location on said top surface spaced apart from the collection location, so as to engage floating material and convey the same along the top surface to the collection location; and paddle means extending from said first location to a second location on said rotatable means to engage and immerse material floating on said top surface so as to improve heat transfer and possible melting of metals thereat.

7. Apparatus as in claim 2, wherein:

said second means comprises conveyor means extending through said upper layer of molten metal and into said lower layer thereof, and operative to move said sunken solids to a discharge point above the molten metal.

8. Apparatus as in claim 7, wherein:

said conveyor means extends on a diagonal path through said upper layer of molten metal and into said lower layer, and engages said sunken solids and elevates the same to a discharge point above the top surface of said upper layer.

9. Apparatus as in claim 8, wherein:

said tank comprises a sloping wall extending diagonally upwardly from the bottom of the tank; and said conveyor means is disposed along said sloping wall to move the sunken solids upwardly therealong.

10. Apparatus as in claim 9, wherein:

said conveyor means comprises rotatable screw means mounted in operative relation along said sloping wall to convey the sunken solids upwardly from the lower layer through the upper layer to the discharge point.

11. Apparatus as in claim 7, wherein:

said conveyor means comprises rotatable screw means extending diagonally through said upper layer of molten metal and into said lower layer, there to engage said sunken solids and convey the same upwardly through the upper layer to a discharge location in response to rotation of said screw means.

12. Apparatus as in claim 2, wherein:

said first means comprises first conveyor means mounted substantially parallel to the top surface of said upper layer, and operative to engage the solids floating thereon and move the floating solids to a first collection location;

said second means comprises second conveyor means extending downwardly through said upper layer and into said lower layer, and operative to engage the sunken solids and move the same upwardly to a second collection location above the upper layer.

13. Apparatus as in claim 12, wherein:

said first conveyor means comprises first rotatable screw means engaging said top surface to convey the floating solids to said first collection location; and further comprising means defining a wall surface in said tank extending diagonally upwardly from said lower layer of heated fluid into said upper layer; and said second conveyor means comprises second rotatable screw means in operative relation with said diagonal wall surface to convey the sunken solids upwardly along the diagonal wall.

* * * * *